United States Patent [19]

Mishiro et al.

[11] Patent Number: 4,911,044
[45] Date of Patent: Mar. 27, 1990

[54] ULTRASONIC VIBRATION CUTTING DEVICE

[75] Inventors: Shoji Mishiro, Kawasaki; Seiji Hamada, Eda, both of Japan

[73] Assignee: Taga Electric Co., Ltd., Tokyo, Japan

[21] Appl. No.: 152,103

[22] Filed: Feb. 4, 1988

[30] Foreign Application Priority Data

| Feb. 4, 1987 | [JP] | Japan | 62-24047 |
| May 13, 1987 | [JP] | Japan | 62-116187 |
| May 20, 1987 | [JP] | Japan | 62-124721 |

[51] Int. Cl.⁴ .................................................. B25B 29/00
[52] U.S. Cl. ........................................ 82/158; 82/904; 82/160
[58] Field of Search .......... 82/24 R, DIG. 9, DIG. 7, 82/21 B, 1 C, 36 R, 34 R, 904

[56] References Cited

U.S. PATENT DOCUMENTS

| 2,704,333 | 3/1955 | Calosi et al. | 82/904 |
| 2,748,298 | 5/1956 | Calosi et al. | 82/904 |
| 3,739,665 | 6/1973 | Kumabe et al. | 82/173 |
| 3,772,538 | 11/1973 | Supitilov . | |
| 3,859,876 | 1/1975 | Shimizu et al. | 82/158 |
| 4,071,141 | 1/1978 | Gray | 76/112 |
| 4,496,321 | 1/1985 | Kumabe et al. . | |
| 4,567,797 | 2/1986 | Folk . | |
| 4,620,121 | 10/1986 | Mishiro | 82/904 |

FOREIGN PATENT DOCUMENTS

| 2537899 | 6/1984 | France . |
| 62-114478 | 5/1987 | Japan . |

*Primary Examiner*—Frederick R. Schmidt
*Assistant Examiner*—Lawrence Cruz
*Attorney, Agent, or Firm*—Oblon, Spivak, McClelland, Maier & Neustadt

[57] ABSTRACT

First and second metal portions are tightened integrally on both surfaces of one or plural sheets of electrostrictive element bodies polarized in the thickness direction and divided in two uniform halves using a tightening tool, thereby a flexible vibrator is provided, and a cutting tool is installed to an output end portion of the flexible vibrator and a work is cut by ultrasonic vibration generated in the flexible vibrator. Workability of the cutting working is improved and the structure is simplified, and the device as a whole is made compact.

33 Claims, 9 Drawing Sheets

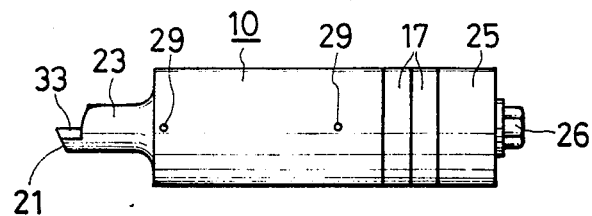
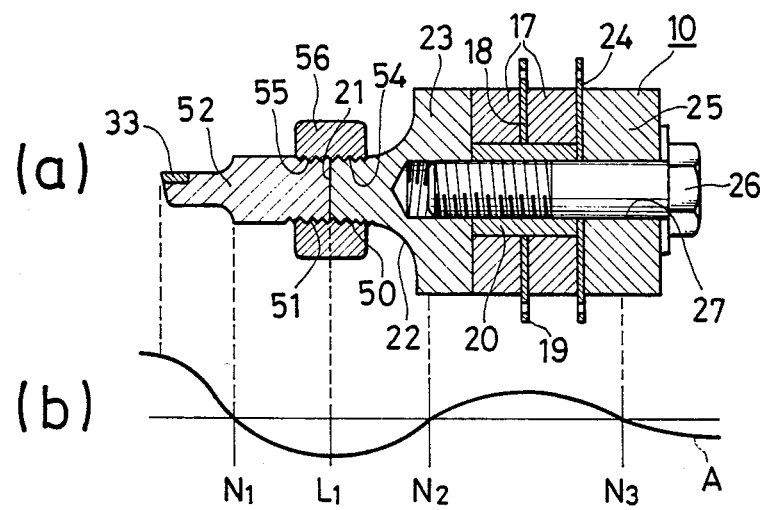
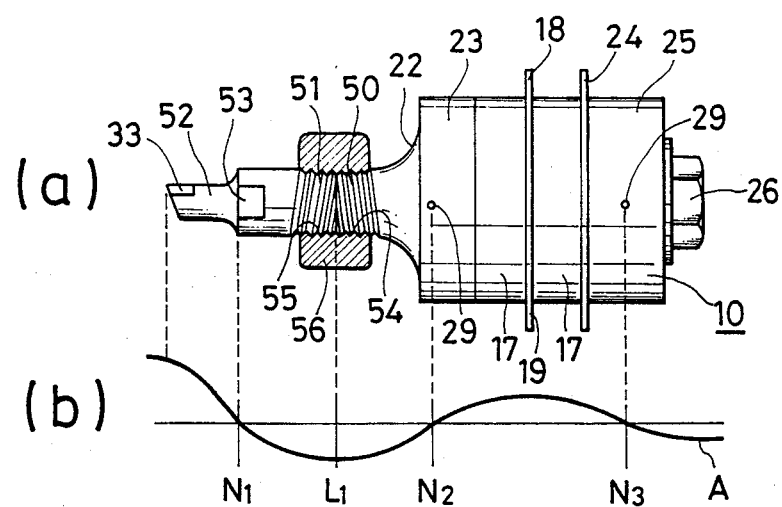

ULTRASONIC VIBRATION CUTTING DEVICE

FIELD OF THE INVENTION AND RELATED ART STATEMENT

The present invention relates to ultrasonic working devices utilizing ultrasonic vibration, particularly ultrasonic vibration cutting devices such as a lathe, a shaper, a planer, and more specifically to an ultrasonic vibration cutting device utilizing flexible vibration as ultrasonic vibration Vibration cutting devices utilizing ultrasonic vibration are well known in the prior art. For example, if a tool shank in a lathe is vibrated in flexible vibration and a tool attached to the top end of the tool shank is subjected to ultrasonic vibration in tangential direction of a work for cutting thereby working is performed, cutting resistance is significantly decreased and the working accuracy is improved thus large effects can be obtained.

FIG. 1 shows such a cutting device as an example in the prior art. On a tool post 1, a pushing plate 2, a tightening bolt 3, a tightening jig 4 and a tool shank (tool holder) 5 to perform bending (flexible) vibration by these are supported. In this case, the tightening jig 4 is set to be positioned to a node portion of the tool shank 5. A cutting tool 7 as a tool facing a work 6 is fixed to one top end of the tool hank 5. A vertical vibrator 8 and an amplitude enlarging horn 9 are contacted at the other end side of the tool shank 5, and positioned on the loop portion of the vibration mode (shown by dash-and-dot line) of the tool shank 5.

In the above ultrasonic vibration cutting device if the vertical vibrator 8 is driven by a ultrasonic oscillator (not shown), the tool shank 5 is vibrated as in the dash-and-dot line shown and the top end of the cutting tool 7 is subjected to ultrasonic vibration in the cutting direction thereby the vibration cutting effects as above described can be exhibited. More specifically, if the cutting speed of the work 6 is made v, vibration frequency of the cutting tool 7 vibrating is made f, and amplitude is made a, the effect can be exhibited under condition that $v < 2\pi f a$.

According to such a structure, since the vertical vibrator 8 as generating source of ultrasonic vibration can be mounted on a position remote from the cutting tool 7, the device can be easily installed to a general-purpose lathe and therefore is advantageous.

Problems in the above-mentioned prior art will be described as follows. First, the vertical vibrator 8 or the enlarging horn 9 may be an obstruction during the working state. Second, the device inevitably becomes large because of its structure. Finally, the cutting tool 7 must be exchanged corresponding to use, and during the changing it is difficult to accurately mount the tool shank 5 to the tool post 1. Consequently, derivative problems as hereinafter exemplified may occur. When the tightening jig 4 is not accurately disposed to the node position of the tool shank 5, energy loss is produced and the edge of the cutting tool 7 is out of the correct vibration direction thereby not only the above-mentioned cutting effects are deteriorated but harmful results are produced. Also troublesome labor and careful caution are required in the changing of the cutting tool 7. Additionally, as shown in FIG. 2, at contacts of the cutting tool 7 with the work 6, in addition to the main component force Pc in the tangential of the work, radial direction back component force Pt directed towards the cutting tool 7 is produced. As a result, the resultant force P of these components acts on the cutting tool 7, thereby a harmful and abnormal vibration is produced and sufficient vibration cutting effect cannot be obtained.

OBJECTS AND SUMMARY OF THE INVENTION

A first object of the invention is to provide an ultrasonic vibration cutting device having structure which does not deteriorate the workability.

A second object of the invention is to provide an ultrasonic vibration cutting device where the device can be made compact.

A third object of the invention is to provide an ultrasonic vibration cutting device where the structure can be simplified.

A fourth object of the invention is to provide an ultrasonic vibration cutting device where accurate mounting of a cutting tool can be easily performed.

A fifth object of the invention is to provide an ultrasonic vibration cutting device where the enlarging ratio of vibration amplitude can be increased.

A sixth object of the invention is to provide an ultrasonic vibration cutting device where vibration loss can be decreased.

A seventh object of the invention is to provide an ultrasonic vibration cutting device where generation of the harmful and abnormal vibration can be prevented.

In the present invention, in the order to attain the foregoing objects, on both surfaces of one or plural sheets of electrostrictive element body which is polarized in thickness direction and divided uniformly in two, metal substances are integrally tightened using a tightening tool, thereby a flexible vibrator is constituted, and a cutting tool is attached to one output end portion of the flexible vibrator, and the flexible vibrator is excited and driven at the resonance frequency and the cutting tool is vibrated in perpendicular direction to the vibrator axis, thus the work is cut by such ultrasonic vibration. Consequently, structure to deteriorate the workability is not produced, and the structure can be simplified and the device as a whole can be made compact. Also in a structure that the flexible vibrator and the cutting tool is assembled or detached using a connecting tool, cutting tools of two types or more can be easily changed.

BRIEF DESCRIPTION OF THE DRAWINGS

FIG. 12 is a schematic side view illustrating a modification regarding support position of the flexible vibrator;

FIG. 13 is a longitudinal sectional view illustrating a second embodiment of the invention;

FIG. 14 is a side view illustrating by cutaway of connection structure between a flexible vibrator and a cutting tool;

DESCRIPTION OF PREFERRED EMBODIMENTS

Figure 3:
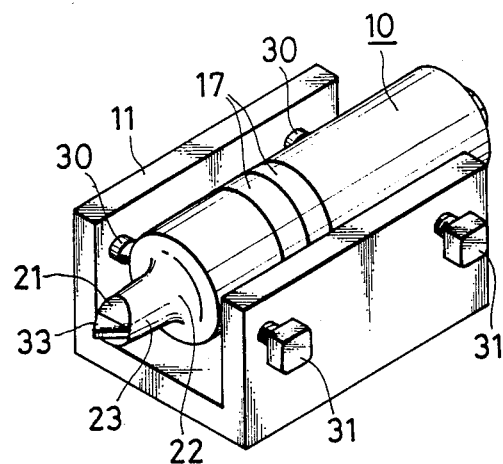
FIG. 3 is a schematic perspective view of a whole device as a first embodiment of the invention.
Figure 4:
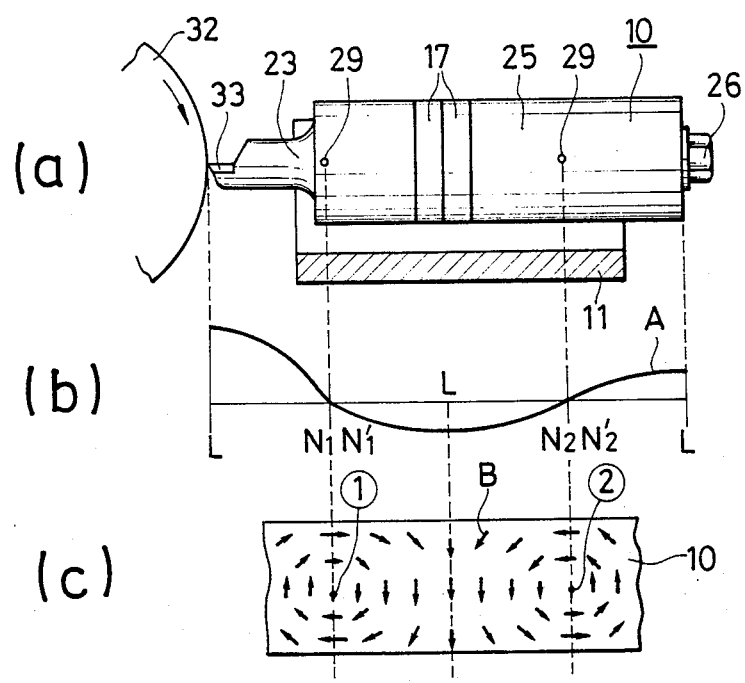
FIG. 4 is a side view illustrating the device including vibration mode.
Figure 5:
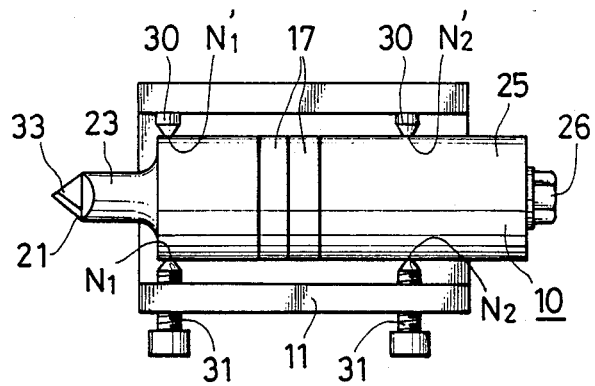
FIG. 5 is a plan view of the device.

A first embodiment of the invention will be described referring to FIGS. 3 through 11. As shown in FIGS. 3 through 5, a flexible vibrator 10 is installed, and enclosed and supported, for example, in a holder 11 formed upward in U-like form.

Figure 6:
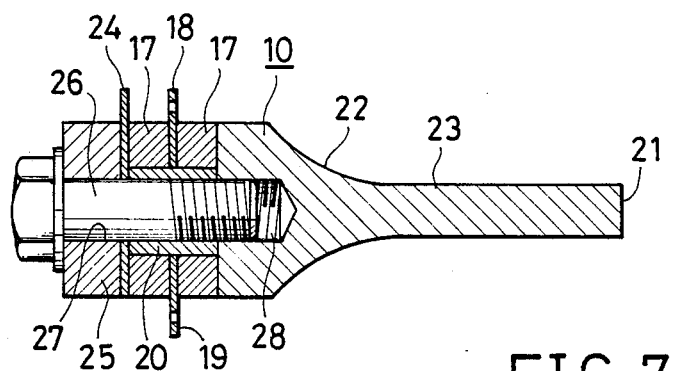
FIG. 6 is a longitudinal sectional view illustrating the basic structure of a flexible vibrator.
Figure 7:
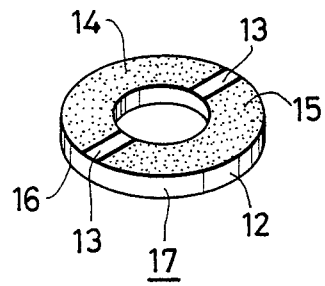
FIG. 7 is a perspective view of an electrostrictive element.
Figure 8:
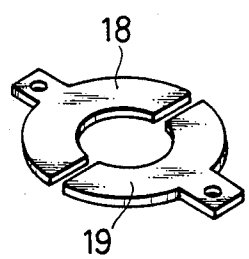
FIG. 8 is a perspective view of an electrode plate.

Now, the basic structure and vibration operation of the flexible vibrator 10 will be described referring to FIGS. 6 through 8. The flexible vibrator 10 is equivalent, for example, to that disclosed in JP A 62-114478 by the present applicant. As shown in FIG. 7, a ring-shaped electrostrictive element body 12 polarized in the thickness direction is installed. On one surface of the electrostrictive element body 12, electrodes 14, 15 are formed in two halves about an insulation portion 13, and on the other surface thereof, a common electrode, 16 is formed as a whole electrode thus an electrostrictive element 17 is constituted by these. For example, two electrostrictive elements 17 in such constitution are prepared and the insulation portions 13 are registered, and two electrode plates 18, 19 in U-like form as shown in FIG. 8 are interposed, and the electrodes 14, 15 are opposed and an insulation cylinder 20 is inserted in the center portion. In one electrostrictive element 17, on the to side of the common electrode 16, an output end portion 21 is made thin, and a metal substance 23 with an exponential step portion 22 which forms a horn for vibration amplitude enlarging is contacted. In the other electrostrictive element 17 on the to side of the common electrode 16, a common electrode plate 24 is contacted and a metal substance 25 is contacted with the common electrode plate 24. These members are fixed integrally by a bolt which acts as a tightening tool and form connecting means. That is, the metal substance 25 is provided with a hole 27 for inserting the bolt 26, and the metal substance 23 is provided with a threaded portion 28 for threaded engagement of the bolt 26 Thus the flexible vibrator 10 in composite vibrator structure used in the embodiment is constituted.

For example, a drive control circuit as hereinafter described is connected to such flexible vibrator 10 through the electrodes 14, 15, the common electrode 16, the electrode plates 18, 19 and the common electrode plate 24, and the flexible vibrator 10 is excited and driven by the drive control circuit.

The drive power source which can be controlled in independent phases from each other is connected to the electrode plates 18, 19 and the common electrode plate 24, and the drive frequency is adjusted to the axial resonance frequency. When the phase difference is made zero, same phase parallel drive is performed, and the output end portion 11 becomes the axial resonance vibration and is vibrated in similar vibration mode to that of the vertical vibrator. On the contrary, if the phase of drive voltage to be applied to the other electrode 19 with respect to one electrode 18 is inverted, i.e., if voltage of reverse phase is applied, the output end portion 21 is bent in a perpendicular direction to the axis and in a dividing direction of the electrostrictive element 17 (i.e., in vertical direction shown in FIG. 6), and performs resonance vibration.

Operation principle of the flexible vibrator 10 to be used in the embodiment has been described. Although the electrostrictive element 17 is ring-shaped and integral, and the polarization direction of residual polarization is in the thickness direction in the above description, for example, each of the electrodes 14, 15 may be supplied with reverse polarization directions from each other in the thickness direction. In this case, voltage of the same phase is applied to the two electrode plates 18, 19, thereby flexible vibration is generated in the output end portion 21. Also the electrostrictive element 17 may be separated and of semicircular ring-shaped element structure, and the polarization direction may be the same direction or reverse direction.

The flexible vibrator 10 in such structure is schematically shown in FIGS. 3 through 5. For example, the characteristics of vibration displacement distribution are shown as characteristics A in FIG. 4(b), such flexible vibrator 10 is constituted to perform flexible resonance in one wave length on the axial line. The flexible vibrator 10 is provided with conical recesses 29 formed on four node positions $N_1$, $N_2$, $N_1'$, $N_2'$ at both lateral sides. Among them, to the conical recesses 29 on the node positions $N_1'$, $N_2'$, two tip end pins 30 fixed to the holder 11 is locked, and to the conical recesses 29 on the node positions $N_1$, $N_2$, top ends of two tip end bolts 31 movably installed to the holder 11 are locked, and when these tip end bolts 31 are tightened, the flexible vibrator 10 is fixed and supported by the holder 11 from both lateral sides. That is, the flexible vibrator 10 is supported at the four node positions in the point contacting state.

The flexible vibrator 10 from the output end portion 21 to the first node positions $N_1$, $N_1'$ is made thin including the exponential step portion 22 so that the flexible vibration displacement at the output end portion 21 is enlarged. The embodiment is characterized in that the cutting tool 33 which performs the cutting of the work 32 is installed directly to the output end portion 21 of the flexible vibrator 10.

The flexible vibrator 10 with the cutting tool 33 installed to the output end portion 21 is supported by the holder 11, if the flexible vibrator 10 is subjected to flexible vibration, the cutting tool 33 at the output end portion 21 performs the resonance vibration significantly in a vertical direction in the state shown in FIG. 4(a). Consequently, if the top end of the cutting tool 33 is pushed to the work 32 rotating in the arrow direction, the vibration cutting of the work 32 is carried out.

According to the cutting device of the embodiment where the cutting tool 33 is installed directly to the output end portion 21 of the flexible vibrator 10, the structure is quite simple and the vertical vibrator as in the ultrasonic vibration cutting device in the prior art becomes unnecessary. Thereby the structure is simplified and the workability is improved. Further, the vibration amplitude enlarging ratio is increased, and the total length may be small in comparison to the vibration system in the prior art thereby the device is made small and compact.

Figure 9:
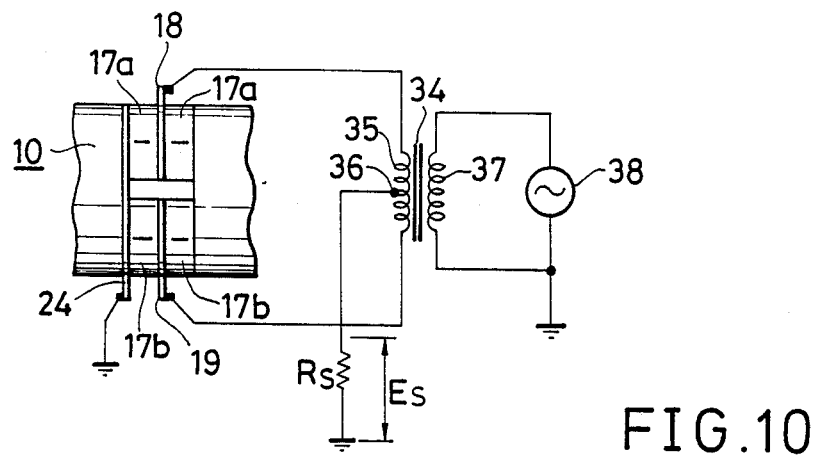
FIG. 9 is a circuit diagram of a vibration system.

Since the flexible vibrator 10 is fixed and held in the point contacting state at the node positions $N_1$, $N_2$, $N_1'$, $N_2'$ of the flexible vibration, holding of the vibration body (i.e., the flexible vibrator 10) becomes simple and secure. Also, due to the point contacting holding, vibration loss becomes little and the drive becomes efficient. The reason will be described referring to FIG. 4(c). FIG. 4(c) shows instantaneous vibration displacement distribution viewing from the side of the flexible vibrator 10 in amount and direction of each arrow B, and the distribution in FIG. 4(c) corresponds to characteristics A of the flexible vibration displacement distribution on the axial direction shown in FIG. 4(b). L designates the loop position. As understood also from each arrow B in FIG. 4(c), even at the node positions $N_1$, $N_2$, displacement in the axial direction is performed at a position remote from the axial line of the flexible vibrator 10, thereby it follows that points at the node positions $N_1$, $N_2$ and designated by 1, 2 on the center axis only always stand still That is, in every neighboring node positions $N_1$, $N_2$ about the points 1, 2 , direction is changed and displacement is performed in the rotational direction. On account of such condition, if the flexible vibrator 10 is held at the points 1 2 as its theoretical still points in the point contacting state, the drive has little vibration losses and good efficiency becomes possible When any of the electrostrictive element 17 in the flexible vibrator 10 is polarized in the same direction as the thickness direction and arranged, the drive system of the flexible vibrator 10 may be constituted as shown in FIG. 9. In FIG. 9, the direction of residual polarization is shown by arrow in each of the electrostrictive elements 17a, 17b divided in two by the insulation portion 13. The electrode plates 18, 19 are connected to both ends of a secondary winding 35 of an output transformer 34. A center tap 36 of the secondary winding 35 is grounded through a detection resistor $R_s$. On the other hand, a drive power source 38 is connected to both ends of a primary winding 37 of the output transformer 34, and one end of the drive power source 38 is grounded. Also the common electrode plate 24 is grounded.

In such constitution, if the system is excited from the drive power source 38 with drive frequency matched to the resonance frequency of the flexible vibrator 10, drive voltage in reverse phase to each other is applied to the electrode plates 18, 19. Consequently, when one divided electrostrictive element 17a is extended the other electrostrictive element 17b is contracted, thereby the flexible vibrator 10 generates the resonance vibration. In this state, the cutting tool 33 installed at the output end portion 21 is vibrated significantly in the perpendicular direction to the axis (in vertical direction) by the step in the node portion, and if the cutting tool 33 is pushed to the rotating work 32, the cutting working is carried out.

Figure 1:
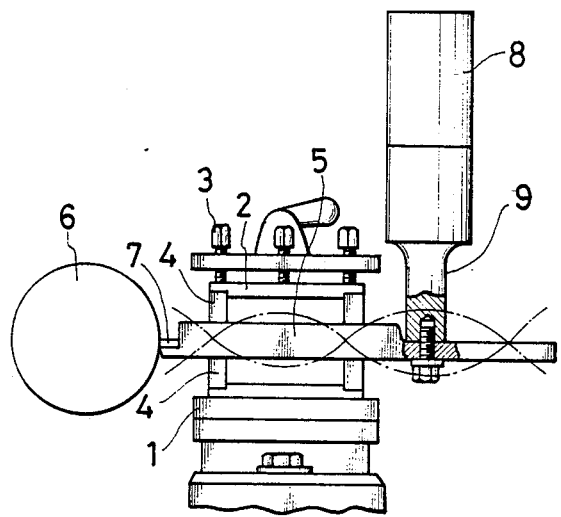
FIG. 1 is a side view of a whole device as an example in the prior art.
Figure 2:
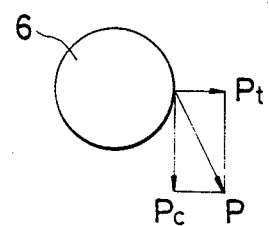
FIG. 2 is a side view illustrating directions of force of a cutting tool to a work.

The vibration direction of tee cutting tool 33 is tangential to the work 33, and as described with reference to FIG. 2, if the back component force in the axial direction is applied to the cutting tool, the vibration cutting effect will be eliminated. Consequently, the angle of the axial line of the flexible vibrator 10 may be set so that such back component force is not applied to the cutting tool 33. In order to attain this, for example, such back component force is detected, and the back component force may be made zero (Null) at setting the angle of the axial line of the vibrator. The angle setting can be performed, for example, by the adjustment of the mounting angle of the holder 11 to the machine tool.

Now, detection of the back component force will be described referring to FIG. 9. In FIG. 9, signal voltage $E_s$ is generated in the detection resistor Rs by piezoelectric phenomenon when stress of the same direction is applied simultaneously to both electrostrictive elements 17a, 17b. Since the extending or contracting direction is reverse in both electrostrictive elements 17a, 17b, the signal voltage $E_s$ is not detected to the load in the vibration direction component. On the other hand, if the back component force is applied during the cutting working, the signal voltage $E_s$ is generated by receiving the force in the axial direction, thereby it is discriminated whether the back component force exists or not. Consequently, while the value of the signal voltage $E_s$ across the detection resistor Rs is monitored, the angle setting of tee axial line of the flexible vibrator 10 to the work 32 may be performed. If the detection function of the back component force is not required, the detection resistor $R_s$ may be omitted and the center tap 36 of the secondary winding 35 of the output transformer 34 may b directly grounded.

Figure 10:
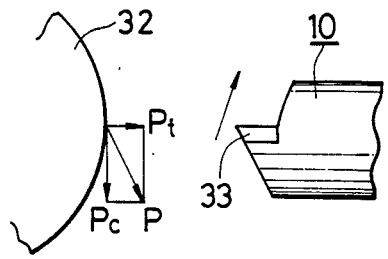
FIG. 10 is a side view illustrating directions of force of a cutting tool to a work.

This may be applied also when the vibration direction of the cutting tool 33 is shifted from the perpendicular direction to the axial direction. That is, as shown in FIG. 10, when the vibration direction of the edge of the cutting tool 33 is shifted from the perpendicular direction to the axial direction, if the vibration direction is not coincident with the direction of the resultant force P including the back component force Pt from the work 32, since the axial component is applied to the flexible vibrator 10, the abnormal state of the vibration direction is found by the signal voltage $E_s$ across the detection resistor $R_s$. In this constitution, including shifting of the vibration direction of the cutting tool 33 from the perpendicular direction to the axial line, coincidence with the direction of reaction of the work 32 is made an therefore the good vibration cutting condition can be set.

Figure 11:
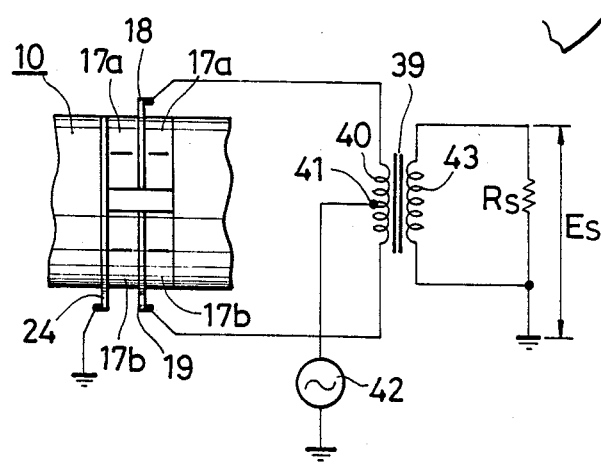
FIG. 11 is a circuit diagram illustrating a modification to the vibration system.

As shown in FIG. 11, when the flexible vibrator 10 has the electrostrictive elements 17a, 17b with the direction of the residual polarization reversed to the thickness direction about the dividing line of the electrostrictive element 17 as the border, the drive system shown in FIG. 11 may be used. That is, each of the electrode plates 18, 19 is excited by voltage in the same phase as that of the resonance frequency, and connection position of the drive power source and the detection resistor is changed in comparison to FIG. 9. Both ends of a primary winding 40 of a detection transformer 39 are connected to the electrode plates 18, 19, and a drive power source 42 is connected to a center tap 41 of the primary winding 40 and grounded. On the other hand, the detection resistor $R_s$ is connected to both ends of a secondary winding 43, and one end thereof is grounded.

According to this constitution, since excitation output from the drive power source 42 is applied in the same phase to both electrostrictive elements 17a, 17b, when one electrostrictive element 17a or 17b is extended the other electrostrictive element 17b or 17a is contracted, thereby the flexible resonance vibration is performed. If uniform axial vibration is sensed by the electrostrictive elements 17a, 17b, voltage in the reverse phase is generated and therefore the signal voltage $E_s$ is detected at both ends of the detection resistor $R_s$. Also in this case, if the detection function is not required, the electrode plates 18, 19 may be connected in parallel, and then connected directly to the drive power source 42.

FIG. 12 shows a modification regarding support position by four points of the flexible vibrator 10. That is, the arrangement position of the electrostrictive element 17 is changed so that the electrostrictive element 17 is not disposed in the position of the conical recess 29 being the support position of the flexible vibrator 10. According to such structure, since the electrostrictive element 17 is disposed out of the support positions by four-point contacting, relative position shifting of the node position due to tightening during the vibrator assembling, i.e., shifting of the position of the conical recess 29, can be prevented.

Although the embodiment has been described in application to a lath,, application of the embodiment to other cutting machines such as a planer or a shaper is not obstructed.

Also the form of the flexible vibrator 10 is not limited to a circular cross-section, but may be, for example, a square cross-section.

Furthermore, the number of the electrostrictive elements 17 to be used is not limited to two, but may be one, three or more.

Next, a second embodiment of the invention will be described with reference to FIGS. 13 and 14. The same parts and equivalent parts to those in the first embodiment are designated by the same reference numerals, and the description shall be omitted. In this embodiment, the cutting tool 33 is detachably installed to the flexible vibrator 10. That is, the cutting tool 33 is not installed directly to the output end portion 21 of the flexible vibrator 10, but a right-handed male screw thread 50 is formed on an outer circumferential surface thereof. The cutting tool 33 is fixed to one end by silver brazing method or the like, and a tool holder 52 with a left-handed male screw thread 51 of the same diameter as that of the right-handed male screw thread 50 formed on the outer circumferential surface is installed on the other end. A spanner setter 53 is formed on a part of the outer circumferential surface of the tool holder 52. Further, a tightening ring 56 which is a connecting tool is installed, and a right-handed female screw thread 54 and a left-handed female screw thread 55 are formed on an inner circumferential surface of the tightening ring 56, and a spanner setter (not shown) is formed on an outer circumferential surface thereof The right-handed female screw thread 54 of the tightening ring 56 is threadedly engaged with the right-handed male screw thread 50 of the flexible vibrator 10, and the left-handed female screw thread 55 is threadedly engaged with the left-handed male screw thread 52 of the too holder 52, thereby the flexible vibrator 10 and the tool holder 52 are tightened. In this case, the spanner setter of the tightening ring 56 serves for the tightening, and the spanner setter 53 of the tool holder 52 serves mainly for the angle registering Thus the cutting tool 33 is detachably installed to the flexible vibrator 10. Consequently, if a plurality of tool holders 52 with various cutting tools 33 fixed thereto are provided, cutting work by any sort of cutting tool 33 can be performed by simply changing the tool holder 52 without removing the flexible vibrator 10 from the holder 11. Also when regrinding of the cutting tool 33 is required, the tool holder 52 is detached from the flexible vibrator 10 and can be used for the working easily and rapidly.

On the other hand, in this embodiment, the flexible vibrator 10 is driven so that characteristics of the vibration displacement distribution becomes characteristics A shown in FIG. 13(b) and FIG. 14(b) for example. That is, the edge of the cutting tool 33 is disposed naturally to the loop position, and also the tightening ring 56 is disposed to the loop position $L_1$. Thereby the mass of the tightening ring 56 is added to the loop position $L_1$, which contributes to the enlarging of the vibration amplitude of the cutting tool 33. Moreover, since the equivalent mass of the ½ wave length resonance region is increased in region from the loop position $L_1$ to the edge of the cutting tool 33, both the vibration speed and the vibration inertia of the cutting tool 33 are increased. This contributes to the increase of the instantaneous energy during cutting being proportional to the product of the equivalent mass and the vibration speed. Furthermore, since the distance between $N_1$ and $N_2$ as node positions of the vibration is decreased, the distance from the support position $N_2$ of the flexible vibrator 10 to the edge of the cutting tool 33 is decreased, thereby the mechanical rigidity is increased. With the above characteristics, good vibration cutting effects can be realized.

Next, experiment examples to confirm improvement of such vibration cutting effects will be described. As a first experiment example, the flexible vibrator 10 is constituted in that the two electrostrictive elements 17 divided in two , having a diameter of 45 mm and thickness of 5 mm are assembled between steel substances with large diameter portion of $\phi$45 mm and small diameter portion of $\phi$18 mm. The tool holder 52 is constituted in that a superhard cutting tool 33 is contacted in silver brazing to an end portion of a steel substance with large diameter portion of $\phi$18 mm and small diameter portion of $\phi$10 mm. The tightening ring 56 is a hexagon nut where a right-handed female screw thread and a left-handed female screw thread with M18 are machined on an inner circumference of diagonal 22 mm and length 16 mm. When power of 10 W in the resonznce frequency 19.05 kHz was inputted under such conditions, the vibration amplitude of 30$\mu$p-p was obtained in the cutting tool 33. As a result, the vibration speed could be increased by 15% in comparison to that without the tightening structure by the tightening ring 56.

As a second experiment example, when the tightening ring 56 in the above-mentioned first experiment example was changed to that having a notch of the spanner setter with outer diameter $\phi$30 mm and width 27 mm, the resonance frequency was decreased to 17.63 kHz, and when power of 11.2 W was inputted the vibration amplitude of 41$\mu$p-p was obtained in the cutting tool 33. As a result, in comparison to the first experiment result, the vibration speed ratio became 1.2 times and the vibration speed was increased by about 20% in comparison to the same excitation power.

Figure 15:
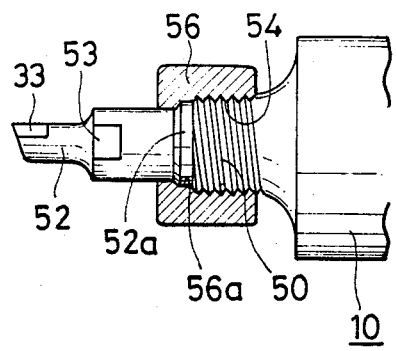
FIG. 15 is a longitudinal sectional view illustrating a modification of the connection structure between the parts.
Figure 16:
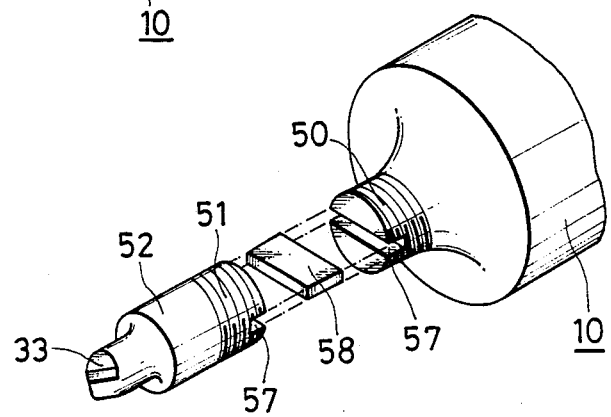
FIG. 16 is an exploded perspective view illustrating another modification of the parts.

In addition, two modifications regarding connection structure between the flexible vibrator 10 and the tool holder 52 will be mentioned. FIG. 15 shows an embodiment where the tightening ring 56 is of cap nut structure. That is, only when the tightening ring 56 is threadedly engaged with the flexible vibrator 10, an edge portion 52a formed on the tool holder 52 is pressed to the output end portion 21 of the flexible vibrator 10 by a step portion 56a formed on the inner circumferential surface of the tightening ring 56, thereby the flexible vibrator 10 and the tool holder 52 are fixed. According to such a structure, connection between the flexible vibrator 10 and the tool holder 52 can be performed more simply and rapidly. On the other hand, FIG. 16 shows another modification where a slit 57 is provided on each contact portion between the flexible vibrator 10 and the tool holder 52, and a positioning plate 58 as rotation preventing means is inserted in the slit 57, thereby the flexible vibrator 10 and the tool holder 52 are connected. In this case, tightening between the flexible vibrator 10 and the tool holder 52 is performed in that the tightening ring 56 is threadedly engaged with the right-handed male screw thread 50 of the flexible vibrator 10 and the left-handed male screw thread 51 of the tool holder 52 as show in FIG. 16, or in the cap nut structure as shown in FIG. 15. Also the forming position of the slit 57 is previously set to so that the tool holder 52 is i the correct mounting direction to the flexible vibrator 10. Consequently in such structure, the positioning of the tool holder 52 during tightening becomes unnecessary.

Figure 17:
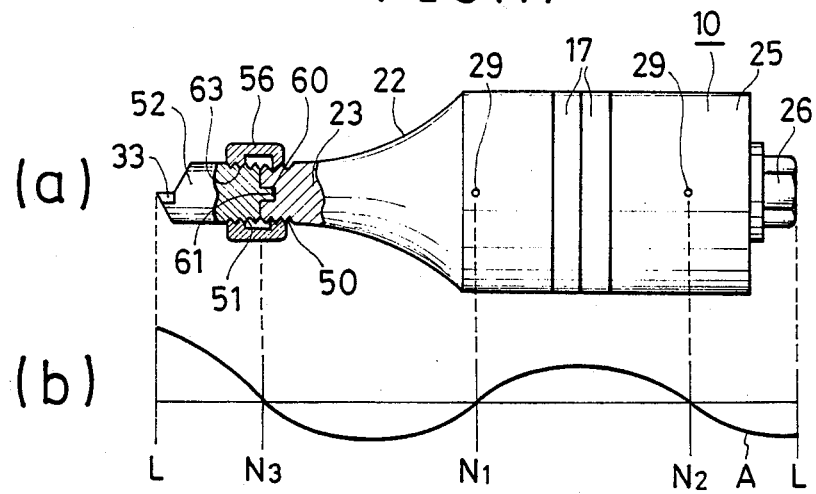
FIG. 17 is a side view illustrating a third embodiment of the invention.
Figure 18:
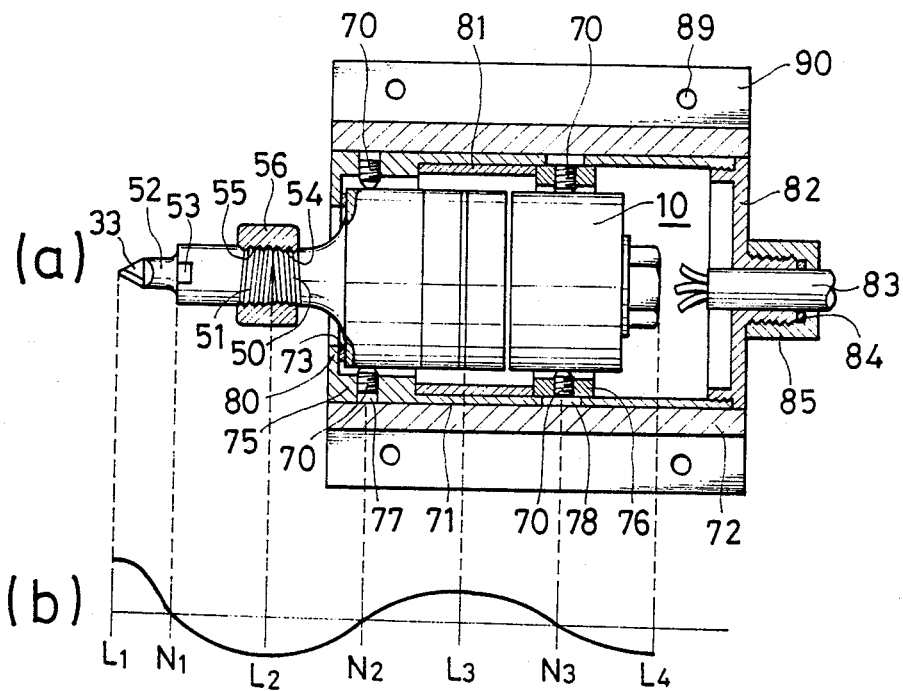
FIG. 18 is a transverse plan view of a whole device illustrating a fourth embodiment of the invention.
Figure 19:
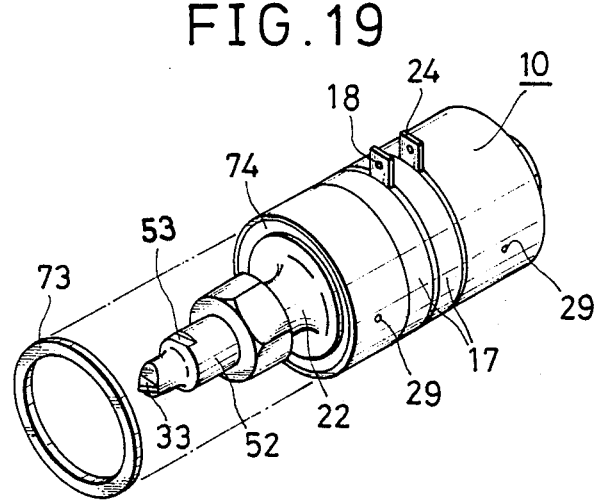
FIG. 19 is a perspective view of a flexible vibrator.
Figure 20:
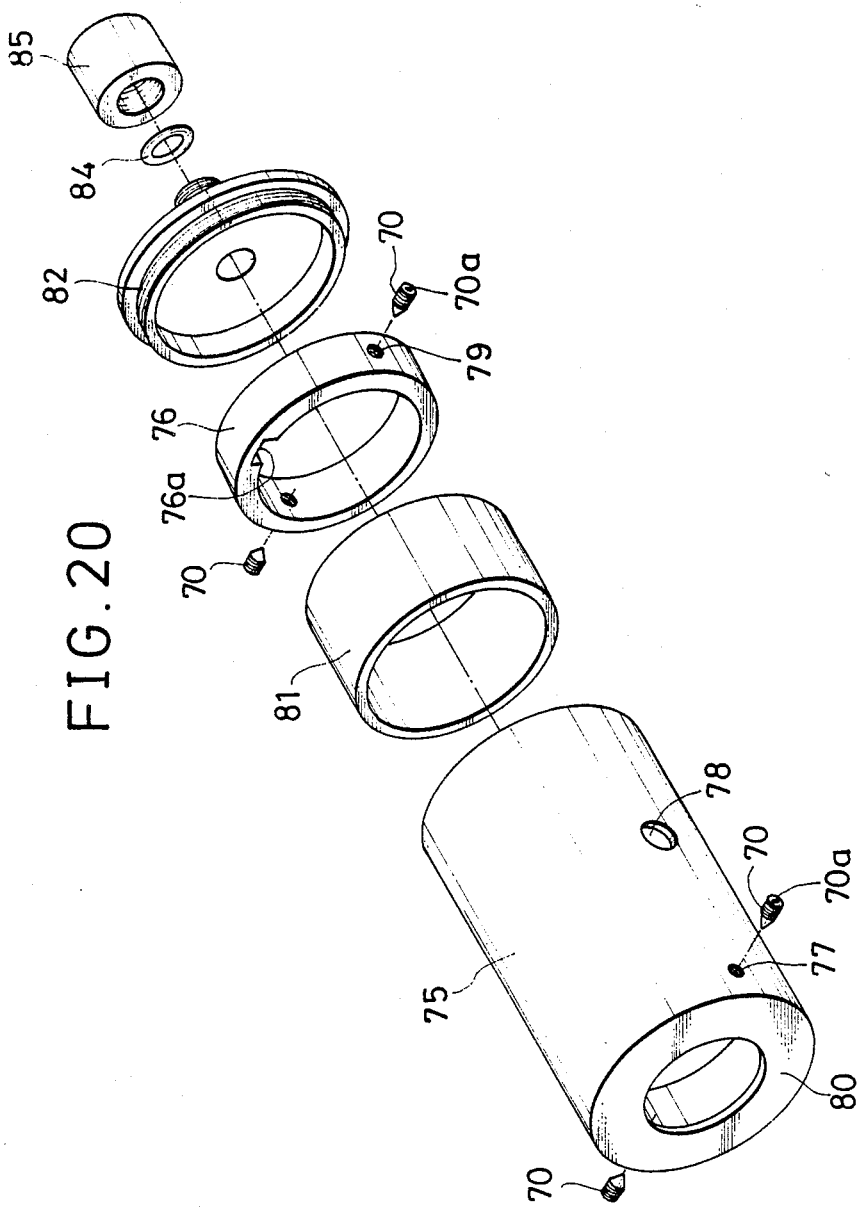
FIG. 20 is an exploded perspective view of a ring-shaped body and its accessories.

Next, a third embodiment of the invention will be described referring to FIG. 17. In this embodiment, the cutting tool 33 is not installed directly to the side of the output end portion 21 of the flexible vibrator 10, and therefore this point is common to the second embodiment and the third embodiment. Consequently, the same parts and the equivalent parts to those in the first embodiment and the second embodiment are designated by the same reference numerals, and the description shall be omitted. On the other hand, the third embodiment is different from the second embodiment in particulars of mounting structure of the tool holder 52 and characteristics of the vibration displacement distribution of the flexible vibrator 10. These points will be described as follows First, the mounting structure of the tool holder 52 will be described. At the output end portion 21 of the flexible vibrator 10, the right-handed male screw thread 50 is formed on the outer circumferential surface and a slit 60 as rotation preventing means is formed on the end surface. On the other hand, at the other end portion of the tool holder 52 in reverse side to the fixing end of the cutting tool 33, the left-handed male screw thread 51 with the same diameter as that of the right-handed male screw thread 50 and in different direction is formed on the outer circumferential surface, and a plate-shaped projection 61 as rotation preventing means to fit to the slit 60 is projected and formed on the end surface. Consequently, in the tightening working between the flexible vibrator 10 and the tool holder 52 where the tightening ring 56 is threadedly engaged with the right-handed male screw thread 50 and the left-handed male screw thread 51, relative rotational movement between the flexible vibrator 10 and the tool holder 52 can be naturally prevented. Consequently, the angle registering of the tool holder 52 becomes unnecessary and the mounting and detaching working of the tool holder 52 is simplified. In addition, as a modification, the mounting structure of the tool holder 52 may be the cap nut structure as described referring to FIG. 15.

Next, characteristics of the vibration displacement distribution of the flexible vibrator 10 will be described. In this embodiment, as shown in characteristics A in FIG. 17(a), the vibration displacement distribution is set so that the standing wave of 1.5 wave length is produced from the rear end of the flexible vibrator 10 to the top end of the cutting tool 33, thereby the connection position between the flexible vibrator 10 and the tool holder 52 is disposed to the node position $N_3$. This is the countermeasure in view of the fact that the connection point between the flexible vibrator 10 and the tool holder 52 becomes weak in the strength. That is, the connection point between the flexible vibrator 10 and the tool holder 52 is disposed to the node position $N_3$ here strain stress is not theoretically applied, thereby weakness of the connection point in the strength is compensated.

Next, a fourth embodiment of the invention will be described referring to FIGS. 18 through 22. This embodiment relates to the holding structure of the flexible vibrator 10. The flexible vibrator 10 to be used is similar to that described in the second embodiment where the cutting tool 33 is detachably installed. Consequently, the same parts and the equivalent parts to those described in the first embodiment and the second embodiment are designated by the same reference numerals, and the description shall be omitted.

In the fourth embodiment schematically, a ring-shaped body 71 having a setscrew 70 to support the flexible vibrator 10 at the node portion is installed on the outer circumference of the flexible vibrator 10, and is tightened by a housing 72 thereby the flexible vibrator 10 is held. Structure of the flexible vibrator 10, the ring-shaped body 71 and the housing 72 will now be described.

In the flexible vibrator 10, R step portion 22 as step portion to form a horn portion is formed, and a groove 74 as formed on a surface where the R step portion 22 is formed and an O-ring 73 is inserted along its circumference. Structure of the flexible vibrator 10 of the fourth embodiment is different from that described in the second embodiment only in this point.

The ring-shaped body 7 comprises a cylindrical sleeve 75 with both ends opened, and a ring 76 pushed in the sleeve 75. At the sleeve 75, two tapped holes 77 are formed and positioned to the node portion $N_2$ of the vibration of the flexible vibrator 10, and two adjusting holes 78 are formed and positioned to the node portion $N_3$. Two tapped holes 79 are formed also at the ring 76 and registered with these adjusting holes 78. The setscrews 70 are threadedly engaged with all four tapped holes 77, 79, and the top end of each setscrew 70 is locked to the conical recess 29 of the flexible vibrator 10 thereby the flexible vibrator 10 is held in the point contacting. A hexagon hole 70a is formed commonly on the head of the setscrew 70. On the other hand, a portion of the cutting tool 33 is projected from an opening on one end of the sleeve 75, and a flange 80 at the opening to project the cutting tool 33. The flange 80 is positioned so that the flexible vibrator 10 held correctly is pressed through the O-ring 73 made of rubber. At a portion between the tapped hole 77 and the ring 76 in the inner circumference of the sleeve 75, an insulation cylinder 81 of circular ring form is inserted, in order to protect the sleeve 75 from the plasma effect which may be produced irregularly and instantaneously in the electrostrictive element 17 t which high voltage is applied.

On an opening of the sleeve 75 at the reverse side to the flange 80, a cap 82 is tightened by screwing. A cable 83 to connect the electrode plates 18, 19 and the common electrode plate 24 to the external circuit is inserted in the cap 82. An 0-ring 84 is fitted to the cable 83 on the outside of the sleeve 75, and is pressed to the cap 82 by a cap nut 85 screwed to the cap 82. At the inside of the sleeve 75 a groove 76a for inserting the cable 75 is cut on the ring 76 so that the connection of the cable 83 to the electrodes 14, 15 and the common electrode 16 is not obstructed.

Figure 21:
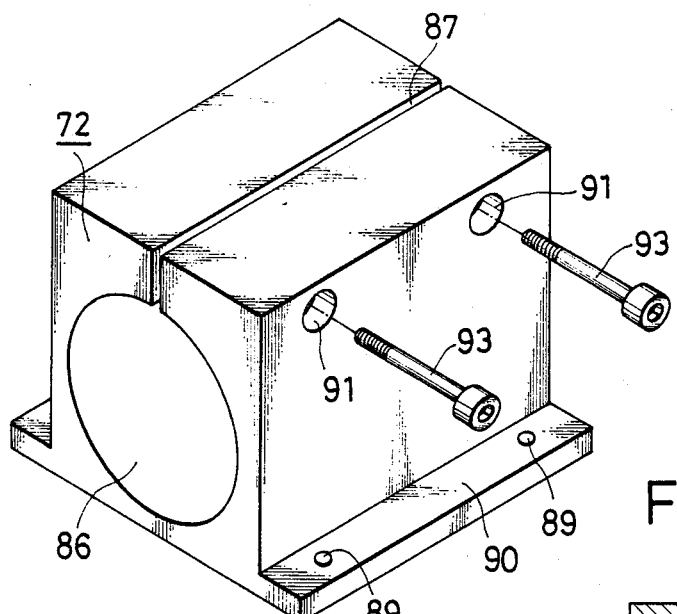
FIG. 21 is a perspective view of a housing.
Figure 22:
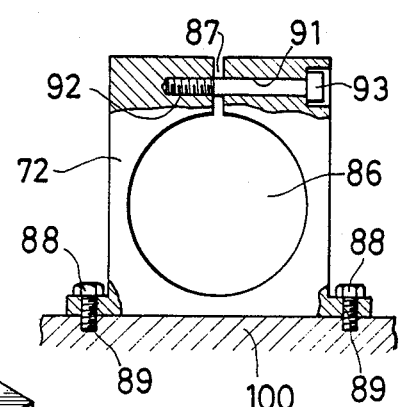
FIG. 22 is a front view partly cutaway of the housing.
Figure 23:
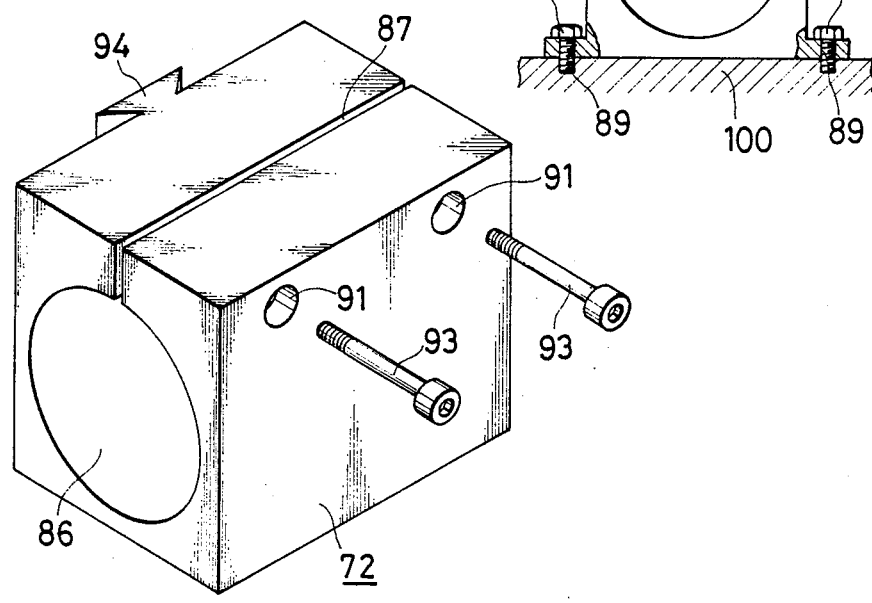
FIG. 23 is a perspective view illustrating a modification of the housing.

As shown in FIGS. 21 through 23, the housing 72 is of parallelopipedon form, and a cylindrical cavity 86 to hold the sleeve 75 penetrates from one end to other end of the housing, and a split groove 87 is formed so that the cavity 86 communicates with the upper surface. On the bottom surface of the housing 72, collar 90 having bolt holes 89 for fixing it using bolts 88 to a workbench 100 such as a tool post, a table or the like is formed. At two thick porions opposed about the split groove 87, two inserting holes 91 are formed in the horizontal direction on one thick portion, and tightening tapped holes 92 as tapped holes corresponding to these inserting holes 91 are formed in the horizontal direction on other thick portion via the split groove 87. A bolt 93 with hexagon hole as tightening body is inserted in each inserting hole 91 and threadedly engaged with each tightening tapped hole 92, and the diameter of the cavity 86 is varied delicately by the tightening condition of these bolts 93 with hexagon hole.

In the ring-shaped body 71, the flexible vibrator 10 is supported by the setscrews 70 at positions of the node portions $N_2$, $N_3$ of the vibration in the pint contacting state. The ring-shaped body 71 to support the flexible vibrator 10 is inserted within the cavity 86 in the housing 72, and fixed with uniform and strong force by tightening the bolts 93 with hexagon hole. Consequently, the flexible vibrator 10 can be held with high rigidity against the cutting force, and the loss to the vibration can be decreased and other secondary advantages can be produced.

Registering of the vibration direction and the cutting direction in the cutting tool 33 can be easily performed in that the bolt 93 with hexagon hole is loosened and the the ring-shaped body 71 to support the flexible vibrator 10 integrally is rotated in the circumferential direction. Consequently, for example, even if the cutting tool 33 is installed slantwise with respect to the fixing direction of the flexible vibrator 10 and the center of gravity of the cutting tool 33 is shifted and the vibration slantwise to the circumferential is produced, the vibration direction of the cutting tool 33 can be rapidly adjusted to be registered with the cutting direction The flexible vibrator 10 is held within the sleeve 75 in air tightness by the O-ring 73 made of rubber and the O-ring 84. Consequently, the cutting liquid supplied to the cutting tool 33 during cutting can be securely prevented from leaking into the electrostrictive element 17.

FIG. 23 shows a modification of the housing 72. In place of the collar 90 on the bottom surface, a tail 94 is provided on a side surface and fitted to a devotail groove (not shown) of a tool post, a table or the like thereby the housing 72 can be fixed at any position and can be moved in vertical direction.

What is claimed is:

1. An ultrasonic vibration cutting device comprising:

a flexible vibrator having a first metal portion, a second metal portion and at least one electrostrictive element disposed between said first and second metal portions, said first metal portion being an output portion and having a cutting tool mounted thereon, said electrostrictive element comprising two uniform halves on one of its surfaces and being polarized in its thickness direction, wherein said first metal portion, said electrostrictive element and said second metal portion are axially aligned and connected to each other by bolt means; and means for establishing two axially spaced nodes, said nodes being at node portions of vibration of said flexible vibrator, one of said nodes being on the first metal portion and the second node being on the second metal portion.

2. An ultrasonic vibration cutting device as set forth in claim 1, wherein said two uniform halves of said electrostrictive element are separated by an insulation portion, the surface of each half comprising an electrode.

3. An ultrasonic vibration cutting device as set forth in claim 1, comprising a pair of semicircular ring-shaped members, said pair of semicircular ring-shaped members being arranged in a circular ring form with a space therebetween and being coaxially positioned between two electrostrictive elements, said semicircular ring-shaped members being polarized in their thickness directions and having an electrode formed on one surface, wherein said semicircular ring-shaped members form a pair of electroplates.

4. An ultrasonic vibration cutting device as set forth in claim 1, wherein said flexible vibrator comprises two electrostrictive elements arranged in the axial direction, with said semicircular ring-shaped members being interposed between said two electrostrictive elements.

5. An ultrasonic vibration cutting device as set forth in claim 17, wherein a back component force produced in said cutting tool is detected by a detection resistor which is connected between the center of said secondary winding and the earth.

6. An ultrasonic vibration cutting device as set forth in claim 1, wherein said bolt means penetrates through said second metal portion and is threadedly engaged in said first metal portion.

7. An ultrasonic vibration cutting device as set forth in claim 1, wherein said first metal portion defines a horn portion for vibration amplitude enlarging.

8. An ultrasonic vibration cutting device as set forth in claim 7, wherein both said output portion and said tool holder have male screw threads formed thereon, said threads of said output portion having an opposite direction to the direction of the threads of said tool holder, wherein said connecting means comprise female screw threads and is threadedly engaged with both said output portion and said tool holder.

9. An ultrasonic vibration cutting device as set forth in claim 8, wherein said output portion has male screw threads formed thereon, said tool holder being connected to said output portion through said connecting means, wherein said connecting means defines a cap nut structure and is threadedly engaged with the male screw threads of said output portion.

10. An ultrasonic vibration cutting device as set forth in claim 1, wherein said means for establishing said two axially spaced nodes comprise two pairs of recesses, said first pair of recesses being diametrically positioned at opposite points of said flexible vibrator and being positioned at said first node, and said second pair of recesses being diametrically positioned at opposite points of said flexible vibrator and being positioned at said first node, and said second pair of recesses being diametrically positioned at opposite points of said flexible vibrator and being positioned at said second node, wherein said flexible vibrator is supported at said recesses.

11. An ultrasonic vibration cutting device comprising:
   a flexible vibrator having a first metal portion, a second metal portion and at least one electrostrictive element disposed between said first and second metal portions, said first metal portion being an output portion and having a cutting tool mounted thereon, said electrostrictive element comprising two uniform halves and being polarized in its thickness direction;
   means for establishing two axially spaced nodes, said nodes being at node portions of vibration of said flexible vibrator, one of said nodes being on the first metal portion and the second node being on the second metal portion, wherein said means for establishing said nodes comprise recesses formed on said flexible vibrator at said node portions;
   a ring-shaped body having setscrews which are fitted to said recesses and surrounds the flexible vibrator;
   a housing which surrounds an outer circumferential surface of the ring-shaped body in a close contact state; and
   tightening means for providing for said close contact state between said housing and said ring-shaped body.

12. An ultrasonic vibration cutting device as set forth in claim 11, wherein said flexible vibrator is supported by said setscrews of said ring-shaped body at four points.

13. An ultrasonic vibration cutting device as set forth in claim 11, wherein seal means are provided on said ring-shaped body to prevent leakage into said electrostrictive element.

14. An ultrasonic vibration cutting device as set forth in claim 11, wherein said housing defines a cavity and a split groove, said ring-shaped body being fitted within said housing and said cavity being in communication with an axial space created by said split groove.

15. An ultrasonic vibration cutting device as set forth in claim 1, wherein a further electrode plate corresponding to respective electrodes of said electrostrictive elements are interposed between said electrostrictive element and said second metal portion.

16. An ultrasonic vibration cutting device as set forth in claim 1, wherein the polarization direction in each half of the electrostrictive element is made the same direction.

17. An ultrasonic vibration cutting device as set forth in claim 16, wherein both ends of a secondary winding of an output transformer are connected to respective divided electrodes of the electrostrictive element with a center tap of said secondary winding being grounded and a drive power source being connected to both ends of a primary winding of an output transformer.

18. An ultrasonic vibration cutting device as set forth in claim 3, wherein the polarization direction in each half of the electrostrictive element is made in a reverse direction.

19. An ultrasonic vibration cutting device as set forth in claim 18, wherein respective electrodes of the divided electrostrictive means are connected in parallel and further connected to the drive power source to thereby form a drive circuit.

20. An ultrasonic vibration cutting device as set forth in claim 18, wherein both ends of a primary winding of an output transformer are connected to respective electrodes of the divided electrostrictive element, a drive power source is connected to a center tap of the primary winding, and a detection resistor is connected across a secondary winding of an output transformer wherein a back component force produced in said cutting tool is detected.

21. An ultrasonic vibration cutting device as set force in claim 7, wherein the horn portion is formed in exponential form.

22. An ultrasonic vibration cutting device as set forth in claim 1, wherein an edge of said cutting tool is positioned on a loop portion of resonance frequency of the flexible vibrator.

23. An ultrasonic vibration cutting device as set forth in claim 1, wherein a tool holder having said cutting tool fixed thereon is detachably connected to said output portion of the flexible vibrator by a connecting means.

24. An ultrasonic vibration cutting device as set forth in claim 23, wherein the connecting means is positioned on a loop portion of resonance wave length of the flexible vibrator.

25. An ultrasonic vibration cutting device as set forth in claim 23, wherein the connecting means is positioned at a node portion of resonance wave length of the flexible vibrator.

26. An ultrasonic vibration cutting device as set forth in claim 23, wherein the cutting tool is fixed to the tool holder by silver brazing.

27. An ultrasonic vibration cutting device as set forth in claim 10, wherein said support positions are remote from the electrostrictive element of the flexible vibrator.

28. An ultrasonic vibration cutting device as set forth in claim 11, wherein the recess defines a conical form.

29. An ultrasonic vibration cutting device as set forth in claim 13, wherein said seal means is an O-ring.

30. An ultrasonic vibration cutting device as set forth in claim 14, wherein said tightening means comprises at least one bolt which is inserted in and threadedly engaged with the housing so as to narrow the axial space created by the split groove.

31. An ultrasonic vibration cutting device as set forth in claim 8 or 9, wherein a rotation preventing means for preventing relative rotation between the flexible vibrator and the tool holder is installed on connecting portion of these members.

32. An ultrasonic vibration cutting device as set forth in claim 31, wherein the rotation preventing means is constituted by a slit formed on the connecting portion between the flexible vibrator and the tool holder, and a positioning plate fitted to the slit.

33. An ultrasonic vibration cutting device as set forth in claim 31, wherein the rotation preventing means is constituted by a slit formed on the output end portion of the flexible vibrator, and a plate-shaped projection projected and formed on the tool holder fitted to the slit.

* * * * *